United States Patent Office 3,385,861
Patented May 28, 1968

3,385,861
PROCESS FOR THE MANUFACTURE OF A 3-UN-SUBSTITUTED 1-[5-NITRO-2-THIAZOLYL]-2-OXO-TETRAHYDROIMIDAZOLE
Konrad Meier, Riehen, and Walter Fuhrer, Zurich, Switzerland, assignors to Ciba Corporation, New York, N.Y., a corporation of Delaware
No Drawing. Filed Dec. 28, 1965, Ser. No. 517,069
Claims priority, application Switzerland, Jan. 20, 1965, 766/65
4 Claims. (Cl. 260—306.8)

ABSTRACT OF THE DISCLOSURE

Process for the manufacture of a compound of the formula

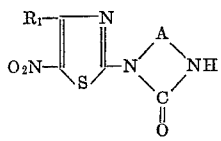

by hydrolysing a compound of the formula

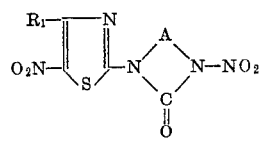

$R_1$ being hydrogen or an aliphatic hydrocarbon radical and A an optionally substituted ethylene radical. Compounds made by this process are useful as antiparasitary compounds.

SUMMARY OF THE INVENTION 2-oxo-tetrahydro-imidazoles that contain in position 1 a 5-nitro-thiazolyl-(2) radical, especially 1-[5-nitro-thiazolyl-(2)]-2-oxo-tetrahydro-imidazole, are known; they possess valuable antiparasitary properties. These compounds are manufactured by known methods, inter alia by nitrating a 2-oxo-tetrahydro-imidazole that contains in position 1 a 5-unsubstituted thiazolyl-(2) radical by known methods used in thiazole chemistry. In this connection it was observed that the yields of pure product are not optimal when one of the usual nitrating methods is employed.

The present invention is based on the observation that 3-unsubstituted 2-oxo-tetrahydro-imidazoles that contain in position 1 a 5-nitro-thiazolyl-(2) radical and in which the carbon atoms of the two heterorings may be substituted by lower aliphatic hydrocarbon radicals, especially by lower alkyl or lower alkenyl groups, are obtained in a simple manner and in the pure state by treating a 3-nitro-2-oxo-tetrahydro-imidazole that contains in position 1 a 5-nitro-thiazolyl-(2) radical with an acidic hydrolyzing agent.

The above-mentioned hydrolysis of the nitro group in the 3-position of the tetrahydro-imidazole ring is achieved by treating the starting material with a dilute acid, especially a mineral acid, such as dilute sulfuric acid, generally at an elevated temperature, preferably within the range from 50 to 150° C., e.g., at the reflux temperature of the hydrolyzing agent. In this connection it is worthy of notice that the 2-oxo-imidazole nucleus is not split under these reaction conditions.

The desired product is isolated by known methods, e.g., by diluting the reaction mixture with water, or by pouring it over ice or into ice water.

The 3-nitro-2-oxo-tetrahydro-imidazoles used as starting material, which contain in position 1 a 5-nitro-thiazolyl-(2) radical, are obtained, for example, by reacting a 2-oxo-tetrahydro-imidazole that contains in position 1 a 5-unsubstituted thiazolyl-(2) radical with fuming nitric acid of 96% strength by a known method, preferably in the presence of concentrated sulfuric acid and at room temperature.

2-oxo-tetrahydro-imidazoles used for the manufacture of the starting materials, that contain in position 1 a 5-unsubstituted thiazolyl-(2) radical, are obtained, for example, by reacting a 5-unsubstituted 2-aminothiazole with a halogenethyl isocyanate and converting the resulting N'-halogenethyl-N-[thiazolyl-(2)]-urea, which contains a hydrogen atom attached to the N-nitrogen atom and whose thiazolyl-(2) radical is unsubstituted in the 5-position, by cyclization, e.g., treatment with a base such as sodium hydroxide solution, into the 3-unsubstituted 2-oxo-tetrahydro-imidazole which contains in position 1 a 5-unsubstituted thiazolyl-(2) radical.

The new process is particularly suitable for the manufacture of the afore-mentioned 1-[5-nitro-thiazolyl-(2)]-2-oxo-tetrahydro-imidazole, using as starting material 3-nitro-1-[5-nitro-thiazolyl-(2)] - 2 - oxo-tetrahydro-imidazole.

The following example illustrates the invention.

Example

A suspension is prepared at room temperature from 52 g. of 3-nitro-1-[5-nitro-thiazolyl-(2)]-2-oxo-tetrahydro-imidazole in ½ liter of a 1:1-mixture of concentrated sulfuric acid and water and brought to reflux by being slowly heated to the boil. When all starting material has dissolved, the reaction mixture is cooled to room temperature, diluted with 1 liter of water and left to itself for one hour. The desired 1-[5-nitro-thiazolyl-(2)]-2-oxo-tetrahydro-imidazole is filtered off, washed with water until it is free from acid, and dried at 90° C. under reduced pressure; it melts at 260 to 261° C.

The starting material is prepared in the following manner:

A solution of 100 g. (1 mol) of 2-aminothiazole in 600 ml. of acetone is cooled to 8 to 10° C., and within 4 hours 105 g. (1 mol) of chlorethyl isocyanate are stirred in dropwise. During this addition the reaction mixture is maintained at room temperature and then heated, during which 300 ml. of acetone are removed by distillation. 530 ml. of 2 N-sodium hydroxide solution are then added, whereupon the product passes temporarily into solution. The reaction mixture is heated and acetone is distilled off until a boiling temperature of 80° C. has been reached. The batch is cooled to room temperature, stirred overnight, and the precipitate is then filtered off. The resulting 1-[thiazolyl-(2)]-2-oxo-tetrahydro-imidazole is washed with water and acetone and dried at 80° C. under reduced pressure; it melts at 212 to 214° C. (yield: 116 g.). The product can be further purified by dissolving it for instance in 2 N-hydrochloric acid, treating the solution with active carbon and neutralizing the filtrate by stirring in 5 N-sodium hydroxide solution.

A solution is prepared at 60 to 70° C. of 34 g. of 1-[thiazolyl-(2)]-2-oxo-tetrahydro-imidazole in 160 ml. of concentrated sulfuric acid (of 96% strength) and cooled to −10° C., and within 30 minutes 17.9 ml. of fuming nitric acid (of 96% strength) are dropped in. The reaction mixture is stirred on for one hour at room temperature and then poured with stirring over 1 kg. of ice. After allowing the batch to stand for 1 hour, the resulting 3-nitro-1-[5-nitro-thiazolyl-(2)]-2-oxo - tetrahydro - imidazole is filtered off and dried at 90° under reduced pressure. The white to pale yellow product decomposes at 228 to 230° C. Yield: 50 g.

What is claimed is:
1. A process for the manufacture of a compound of the formula

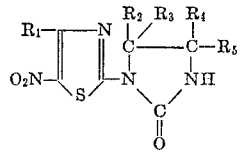

in which $R_1$, $R_2$, $R_3$, $R_4$ and $R_5$ each stands for a member selected from the group consisting of hydrogen and lower aliphatic hydrocarbon, wherein a compound of the formula

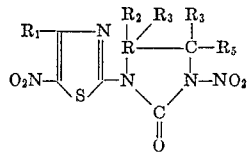

in which $R_1$, $R_2$, $R_3$, $R_4$ and $R_5$ have the above meanings is treated with a dilute mineral acid at a temperature between 50°–150° C.

2. Process according to claim 1, wherein dilute sulfuric acid is used as the hydrolyzing agent.

3. Process according to claim 1, wherein the hydrolysis is carried out at the refluxing temperature of the hydrolyzing agent.

4. Process according to claim 1, wherein 3-nitro-1-[5-nitro-thiazolyl-(2)]-2-oxo-tetrahydro-imidazole is used as the starting material.

References Cited

FOREIGN PATENTS 632,989  11/1963  Belgium.

ALEX MAZEL, *Primary Examiner.*

R. GALLAGHER, *Assistant Examiner.*

UNITED STATES PATENT OFFICE
CERTIFICATE OF CORRECTION

Patent No. 3,385,861     May 28, 1968

Konrad Meier et al.

It is certified that error appears in the above identified patent and that said Letters Patent are hereby corrected as shown below:

Column 3, lines 15 to 20, the formula should appear as shown below:

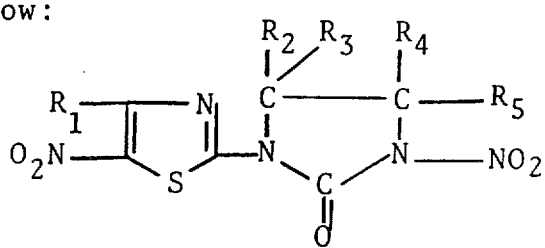

Signed and sealed this 6th day of January 1970.

(SEAL)
Attest:

Edward M. Fletcher, Jr.
Attesting Officer

WILLIAM E. SCHUYLER, JR.
Commissioner of Patents